United States Patent [19]

Hammerslag

[11] Patent Number: 5,711,648
[45] Date of Patent: Jan. 27, 1998

[54] BATTERY CHARGING AND TRANSFER SYSTEM

[75] Inventor: Julius G. Hammerslag, San Juan Capistrano, Calif.

[73] Assignee: Unlimited Range Electric Car Systems Company, San Clemente, Calif.

[21] Appl. No.: 745,423

[22] Filed: Nov. 12, 1996

Related U.S. Application Data

[60] Continuation-in-part of Ser. No. 614,130, Mar. 12, 1996, abandoned, which is a division of Ser. No. 178,101, Jan. 6, 1994, Pat. No. 5,549,443.

[51] Int. Cl.[6] .................................................. B65G 67/02
[52] U.S. Cl. ........................ 414/786; 414/390; 414/398; 320/2; 320/48; 180/68.5; 104/34; 194/210; 194/904
[58] Field of Search .................................. 414/786, 351, 414/345, 343, 340, 390, 391, 395, 273, 396, 392, 393, 398, 399, 400, 401, 572; 104/34; 320/2, 43, 48; 180/68.5; 194/210, 904; 364/478.01, 478.03

[56] References Cited

U.S. PATENT DOCUMENTS

| 1,764,354 | 6/1930 | Schellentrager et al. |  |
|---|---|---|---|
| 1,858,768 | 7/1932 | Ellstrom . |  |
| 3,708,028 | 1/1973 | Hafer . |  |
| 3,838,745 | 10/1974 | Kappei | 180/68.5 |
| 4,299,526 | 11/1981 | Smith . |  |
| 4,334,819 | 6/1982 | Hammerslag | 414/395 |
| 4,342,533 | 8/1982 | Hone | 414/396 |
| 4,450,500 | 5/1984 | Gwyn | 414/281 X |
| 4,896,024 | 1/1990 | Morello et al. | 194/210 X |
| 4,983,903 | 1/1991 | Bae et al. | 320/2 |

FOREIGN PATENT DOCUMENTS

| 2114962 | 8/1972 | Germany . |  |
|---|---|---|---|
| 2236215 | 5/1973 | Germany . |  |
| 2259505 | 6/1974 | Germany . |  |
| 2410102 | 9/1975 | Germany . |  |
| 2422960 | 11/1975 | Germany . |  |
| 93796 | 4/1990 | Japan | 194/904 |
| 294147 | 11/1996 | Japan . |  |
| 1438603 | 6/1976 | United Kingdom . |  |
| 1575005 | 9/1980 | United Kingdom . |  |
| 2277067 | 10/1994 | United Kingdom . |  |

*Primary Examiner*—Frank E. Werner
*Attorney, Agent, or Firm*—Knobbe, Martens, Olson & Bear LLP

[57] ABSTRACT

A battery transfer and charging system for electric vehicles includes a conveyor loop for conveying batteries from a battery receiving station to a battery delivery station. A displacement assembly removes spent batteries of electric vehicles by forcing charged batteries into position within the vehicles so as to laterally displace spent batteries. Spent batteries displaced from vehicles are received by the receiving station, where the batteries are tested both electrically and by comparing battery status data against predetermined criteria. Batteries which fail the battery test are automatically removed from the conveyor loop by a elevator assembly. Batteries are automatically charged as they pass through the conveyor loop in an assembly-line fashion. Following recharge, batteries are conveyed to the displacement station for installation within later vehicles. In one embodiment of the system, vehicles drive through the system in sequential order, stopping at a specified location for battery installation/removal.

14 Claims, 9 Drawing Sheets

BATTERY CHARGING AND TRANSFER SYSTEM

RELATED APPLICATION

This application is a continuation-in-part of U.S. Appl. No. 08/614,130, filed Mar. 12, 1996 (of the same title), now abandoned, which is a division of U.S. Appl. No. 08/178, 101, filed Jan. 6, 1994 (now U.S. Pat. No. 5,549,443).

BACKGROUND OF THE INVENTION

The present invention relates to battery charging and transfer systems. More particularly, the present invention relates to battery charging and transfer systems which enable the automated exchange and charging of electric automobile batteries.

In my prior U.S. Pat. No. 4,334,819 there is disclosed a continuous battery charging system wherein batteries are removed from an electrical vehicle at a battery transfer station. A fresh battery is installed at the transfer station, and the spent battery is placed in a charging system to be charged and returned to the transfer station.

That system contemplates the existence of a need for capability to charge a large number of exchangeable batteries, say, following adoption and acceptance by the motoring public of the concept of electric powered vehicles. One disadvantage of electric powered vehicles is the relatively short range that can be achieved using known battery technology. In order to provide a practical electric vehicle system, battery transfer capabilities must exist at numerous locations, so that the range of travel, without requiring the driver to recharge a battery, may be substantial. This is to say that if the range of an electric vehicle, without recharge of the battery or battery pack is 100 miles, then the user is limited to excursion of 50 miles. However, if at 75 or 100 mile intervals, the user can conveniently replace the partially spent battery with a fresh or fully charge battery, the limit of safe travel is extended.

Thus, my prior patent discloses an invention which enables longer range use of electric vehicles, because charged or fresh batteries can be expeditiously installed in the vehicle at locations along a course of a length greater than the round trip capability of the vehicle battery. Notwithstanding the foregoing, there remains a need for an electric battery charging and transfer system which enables the convenient removal of discharged batteries from a vehicle and replacement with a fully charged battery. The batteries and the charging system must be adapted to efficiently handle the battery during the removal, charging, and installation procedures.

SUMMARY OF THE INVENTION

To render a battery transfer and charging system of the type generically contemplated in my above-identified patent more universally applicable and commercially acceptable, the present invention provides improvements in the system in terms of the transfer method, for exchanging batteries at the transfer station, and in the mode of construction of the charging stations.

More particularly, the present invention contemplates that the electric vehicle is provided with a battery or battery pack in a relatively long and broad, but flat form, which can be laterally installed in the vehicle. The battery may be a unit of, for example, 5' wide, 5' long and 9" in height, or a composite of series connected smaller batteries in a pack or box confining the smaller batteries. In any case, the battery (unit or pack) can be readily laterally displaced from the vehicle, as by being forced from the vehicle by laterally forcing of a fresh battery into a battery seat in the vehicle. In the battery seat, contact of the battery terminals with the drive motor for the vehicle is automatically established.

With such a system, vehicles can be sold with an initial battery which can be exchanged for a fresh battery at a transfer station for a relatively small cost, amounting to the re-charging cost of the battery, plus depreciation and exchange, by a battery charging organization having stations located strategically in areas to service a growing population of compatible electric vehicles.

To facilitate growth of a system of battery transfer stations, the stations according to the present invention are modular in construction. This enables a transfer station to be erected with low initial investment cost. The station can be enlarged as demand increases.

In accomplishing the foregoing, I have provided for a battery transfer station, into which a standardized vehicle can be driven. The vehicle contemplated by the invention has a battery seat means for containing a relatively broad, flat battery. A charged battery can be shifted laterally into position within the battery seat means. As the charged battery is shifted into position, the charged battery comes into contact with the existing battery and laterally forces the existing battery out of the battery seat means to a receiving means. Sprockets of the receiving means engage with notches on the bottom surface of the existing battery as the existing battery is displaced from the battery seat means. The sprockets complete the removal of the existing battery from the vehicle. In alternative embodiments, removal of the battery may be accomplished in-whole or-in-part using drive sprockets in the floor of the battery compartment which engage with the notches on the battery. These sprockets may be powered using an external energy source which is coupled to vehicle (via a slidably-engaging electrical connector) when the vehicle initially enters the charging station.

Drive means are provided to shift a fresh battery horizontally into the battery seat, and means are provided to receive the spent battery in the charging system. The spent battery is tested, rejected if unfit for recharge, or recharged in sequence with other batteries, while being transported through charging locations to the transfer station, for installation in a later vehicle.

The charging and transfer systems of the invention are incorporated in a modular construction, whereby, initially, a small charging station may be established, and as demand grows, second and additional or modules may be added, based on the initial station and utilizing much of the same transfer and handling apparatus.

This invention has other advantages and features which will best be understood by reference to the preferred embodiments disclosed herein, but it is to be understood that the following detailed description and the accompanying drawings are not to be taken in a limiting sense. The invention is defined in the appended claims.

DETAILED DESCRIPTION OF THE PREFERRED EMBODIMENTS

Figure 1:
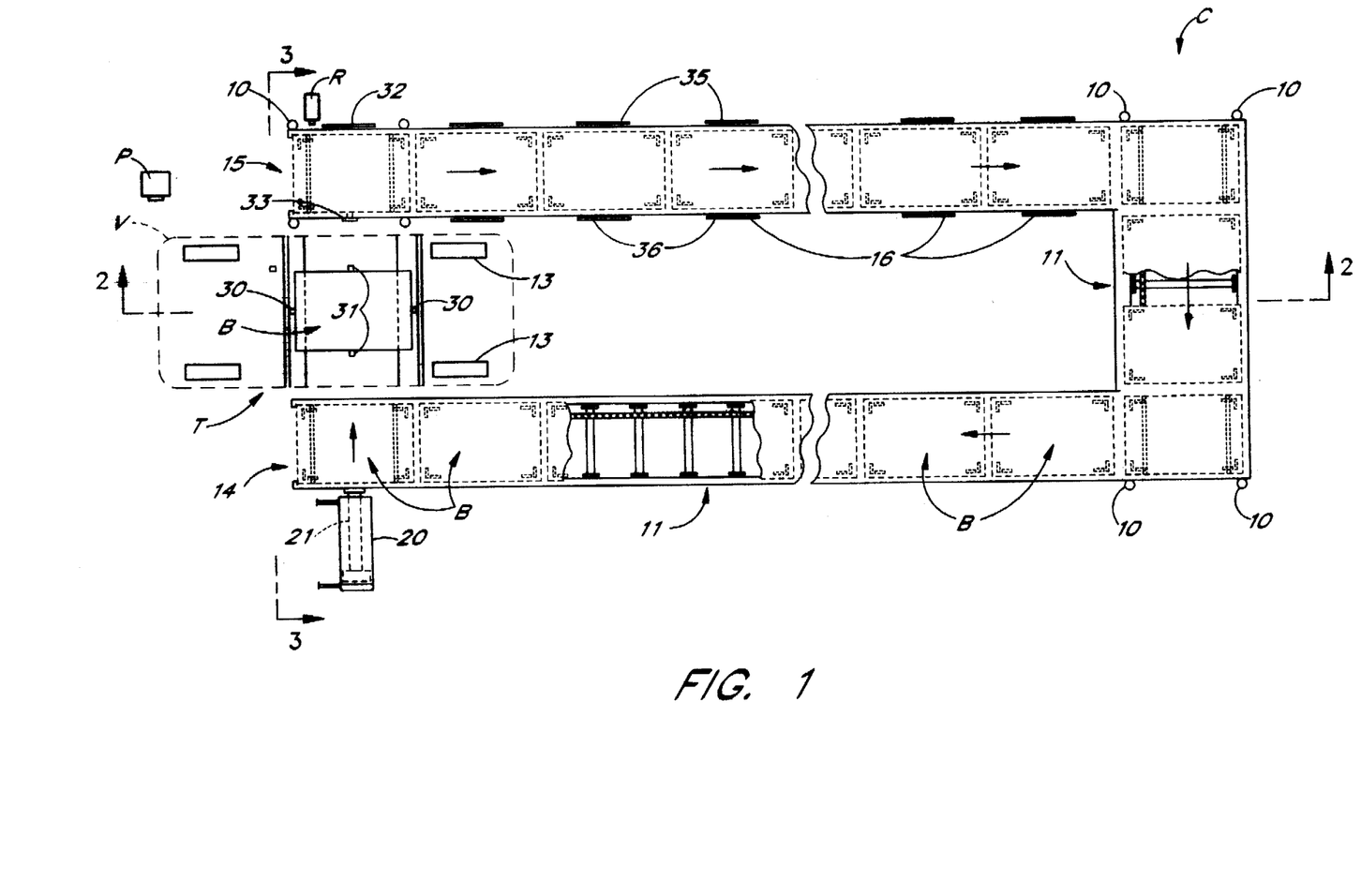
FIG. 1 is a top plan view, with parts broken away, showing a battery transfer and charging system in accordance with the present invention.
Figure 2:
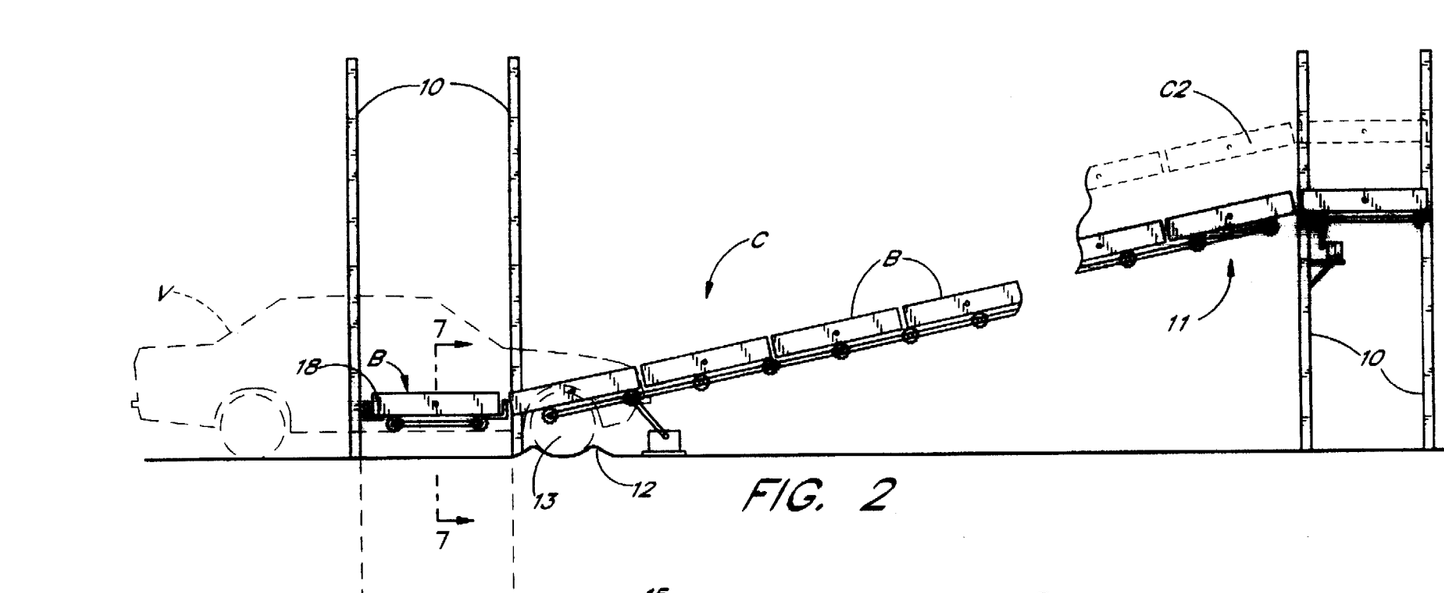
FIG. 2 is a vertical sectional view on the line 2—2 of FIG. 1, showing a first module in full lines, and showing additional modules in broken lines.
Figures 3, 6:
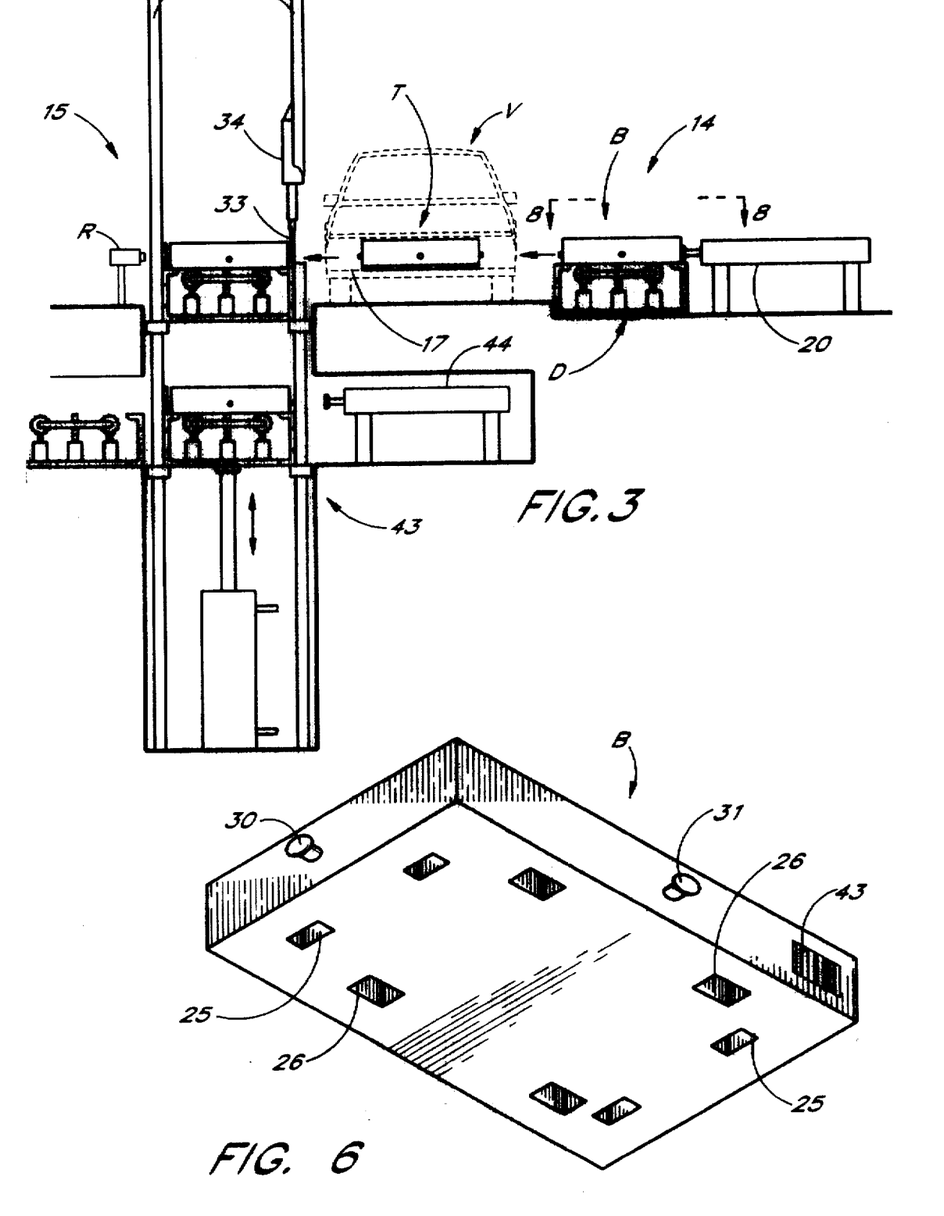
FIG. 3 is a transverse sectional view on the line 3—3 of FIG. 1.
FIG. 6 is a predominantly bottom perspective view of an exemplary battery or battery box for use with the invention.

FIGS. 1-3 illustrate the general layout and structure of a battery charging and transfer system in accordance with a preferred embodiment of the invention. As best illustrated by FIG. 1, the system comprises a continuous battery conveyor loop C which extends from one side of a vehicle station (shown with a vehicle V positioned therein) to the opposite side of the vehicle station. Batteries B move through the conveyor loop from a receiving end or station 15 of the conveyor to a delivery end 14 of the conveyor while being charged via multiple battery chargers 16. The system also includes a transfer station or apparatus T which laterally shifts a fresh (charged) battery into a battery compartment 17 (FIG. 3) of the vehicle V from the delivery end 14 (as described below) while displacing an existing (discharged or partially discharged) battery from the vehicle and onto the receiving end 15 of the conveyor.

As illustrated in FIG. 1, the battery chargers 16 are positioned along the conveyor C at respective battery resting locations ("battery locations") to recharge the batteries as they are conveyed from the receiving end 15 to the delivery end 14 of the conveyor. In the preferred embodiment, a battery charging station 16 is provided at each battery location along the two longitudinal runs or segments of the conveyor C. As described below, the battery position at the receiving end 15 of the conveyor serves as a battery testing and removal station for (i) determining whether each extracted battery can be effectively recharged, and (ii) removing bad batteries from the system.

As illustrated in FIG. 2, the conveyor structure preferably includes a number of vertical support posts 10, on which a frame structure 11 is mounted in a suitable fashion. The posts 10 extend vertically to enable the application thereto of one or more of vertically-spaced expansion modules C2, as further illustrated in FIG. 10 (discussed below). Each expansion module comprises a conveyor loop which is substantially identical in structure and operation to the conveyor loop C described herein.

As further illustrated in FIG. 2, the transfer station T includes a positioning structure 12, shown as a receptacle for the front wheels 13 of the vehicle V, as the vehicle is driven into the transfer station T, whereby vehicles of standard length are uniformly longitudinally positioned in the transfer station. If desired, plural positioning means 12 may be provided at the spaced locations for vehicles of different lengths. As illustrated in FIG. 3, the battery compartment 17 of the vehicle extends through the vehicle below the passenger compartment from one of the vehicle to the other. As illustrated in FIGS. 1 and 3, a hydraulic ram 20 or other shifting means is utilized, in combination with drive sprockets which engage with notches on the batteries (as described below), to shift a charged battery from the conveyor and into the vehicle V. As further described below, the incoming battery displaces the existing vehicle battery from the compartment 17 to a sufficient degree to permit a set of drive sprockets at the receiving end 15 of the conveyor to complete the removal of the existing battery.

As illustrated by FIG. 1, the conveyor structure extends longitudinally from the receiving end 15, thence transversely and in a return run to the delivery end 14. Thus, lateral space to accommodate the vehicle between longitudinal runs is provided. As illustrated in FIG. 2, the transverse section of the conveyor loop (i.e., the segment which connects the two, parallel longitudinal segments) is elevated, with the longitudinal segments upwardly inclined from the transfer station T to the transverse segment. This allows vehicles to drive beneath the elevated, transverse section (between the vertical support posts 10) following battery exchange. Alternatively, the transverse section can readily be positioned beneath the path of the exiting car, if desired. This conveyor arrangement allows vehicles to enter and exit the system without reversing direction, and thus allows vehicles to efficiently pass through the system in a sequential fashion.

Figure 10:
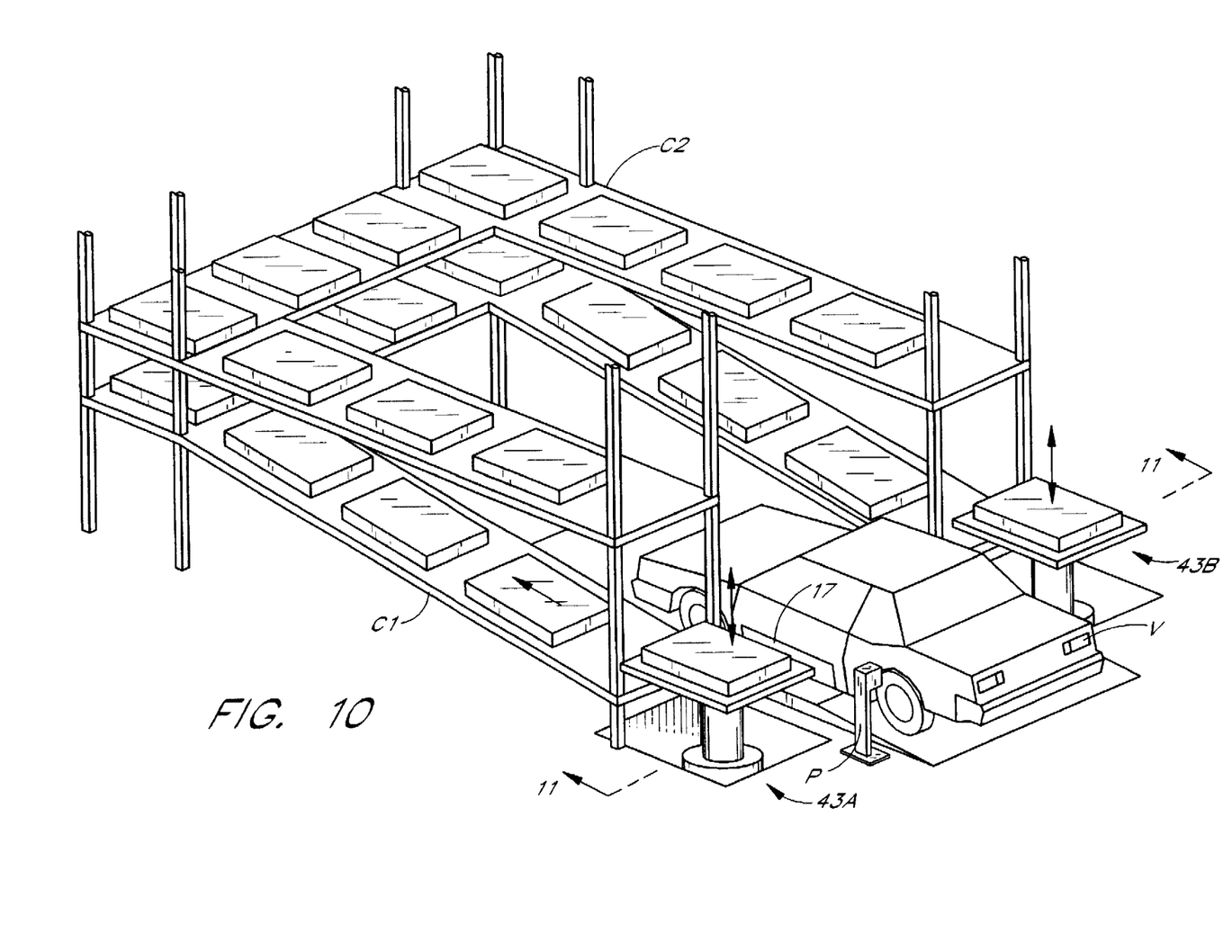
FIG. 10 is a perspective view illustrating the general manner by which expansion conveyors are added to the system.
Figure 11:
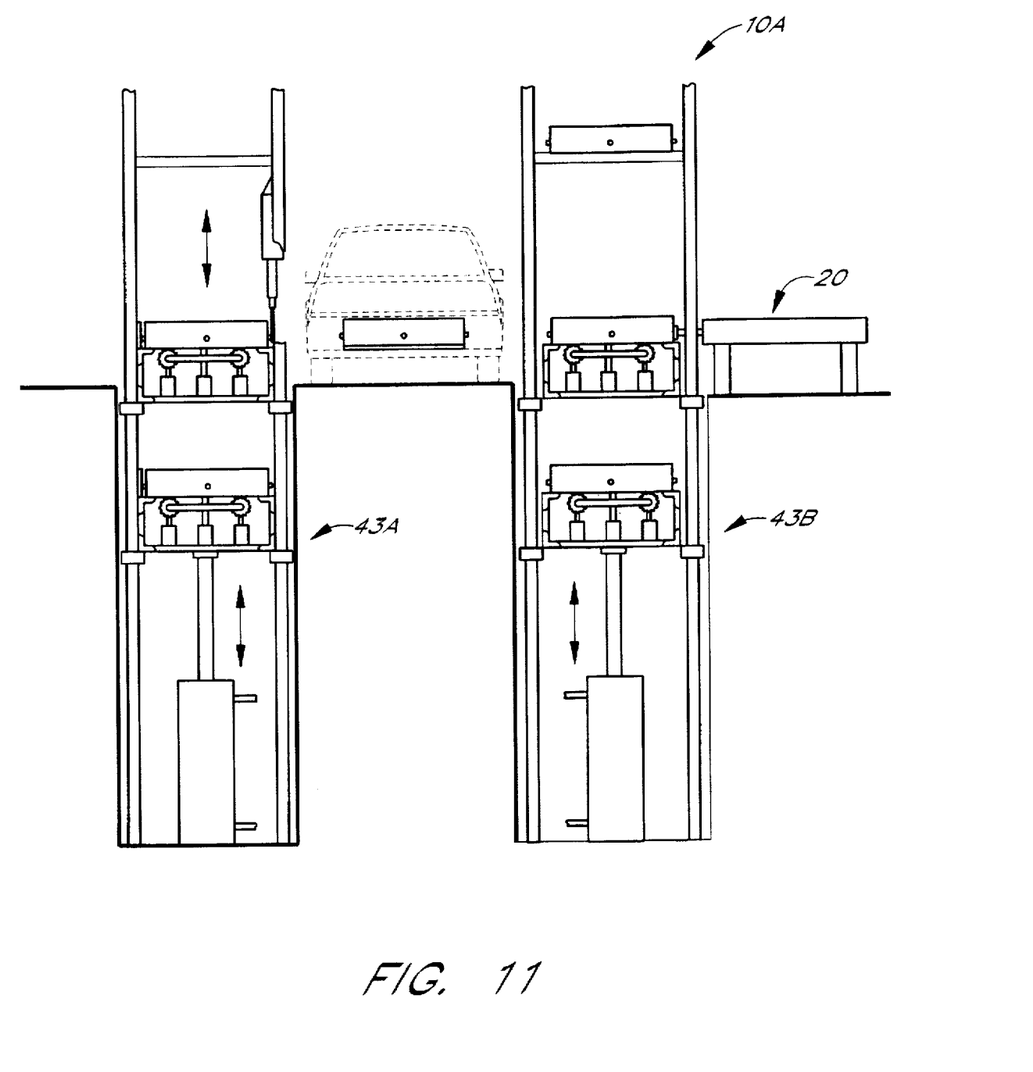
FIG. 11 is a transverse sectional view taken along the line 11—11 in FIG. 10.

With reference to FIG. 3, the system includes a battery elevator assembly 43 which allows the extracted battery to be shifted vertically relative to the conveyor C following removal from the vehicle. The elevator assembly 43 operates in cooperation with a battery removal assembly 44 to remove batteries from the conveyor system, such as when the extracted battery fails a battery test. The elevator assembly 43 is also coupled to a battery insertion assembly (not shown) for inserting new batteries into the conveyor system to replace discarded batteries. In implementations which include one or more expansion modules C2 (as in FIGS. 10 and 11), the elevator assembly 43 is also used move batteries between the multiple conveyor levels, as further described below. A second battery elevator may be provided at the battery delivery end 14 of the conveyor, as illustrated in FIGS. 10 and 11.

Figure 4:
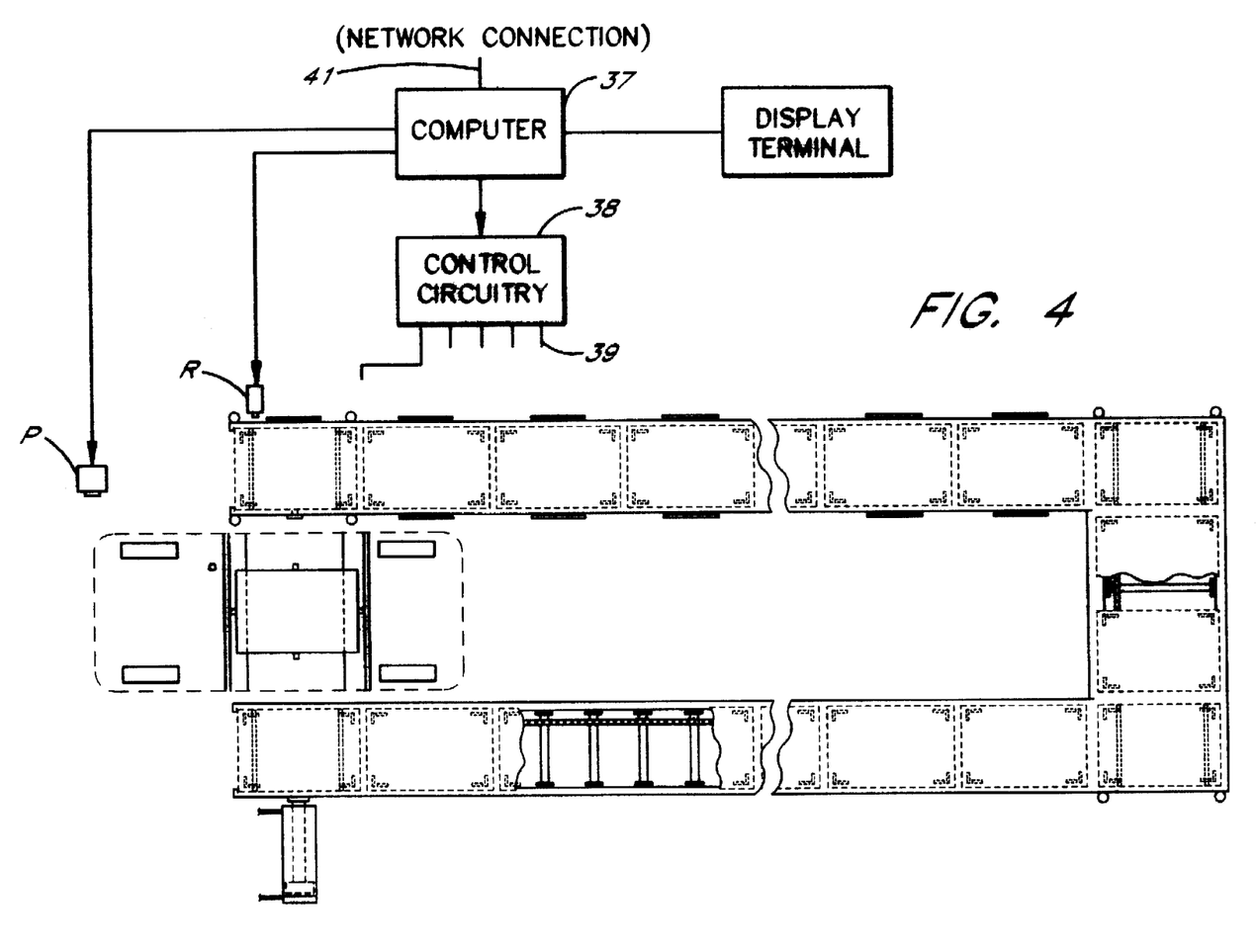
FIG. 4 illustrates the primary computer-based components of the system.

As depicted in FIG. 4, the system includes a computer 37 which controls the operation of the conveyor via conventional control circuitry 38. The control circuitry 38 may be in the form of one or more standard add-on cards which plug into expansion slots of the computer. The control circuitry 38 is coupled to the various electrically-actuated components of the conveyor and elevator assemblies via respective control lines 39, which carry control signals generated by the control circuitry in response to commands from the computer 37.

The computer 37 is preferably coupled to an electronic payment system P (FIGS. 4 and 10) which allows an operator of the vehicle V to enter payment information for paying a fee associated with the exchange of a battery. In the preferred embodiment, the payment system P comprises a magnetic card reader in combination with a standard keypad (not shown). In other embodiments, the payment system P may include, for example, and RF (radio frequency) transceiver which communicates bi-directionally with vehicle transponders of the type commonly used for making toll road payments.

The computer 37 is also preferably coupled to at least one bar code reader R, which is positioned along the conveyor to read bar code labels (FIG. 6) on the batteries. The bar code labels include battery ID codes which uniquely identify the batteries of the system. In a preferred embodiment, the computer uses these ID codes to access a centralized database and server 40 (FIG. 5A) via a network connection 41, such as a continuous connection to the Internet. As will be appreciated by those skilled in the art, other types of electronic sensing systems can be used in place of the disclosed bar code system. For example, the batteries could be provided with small, embedded RF transmitters, such as MicroStamp™ transmitters available from Micron Communications Inc., which transmit ID codes to a base RF receiver of the station.

Figure 5A:
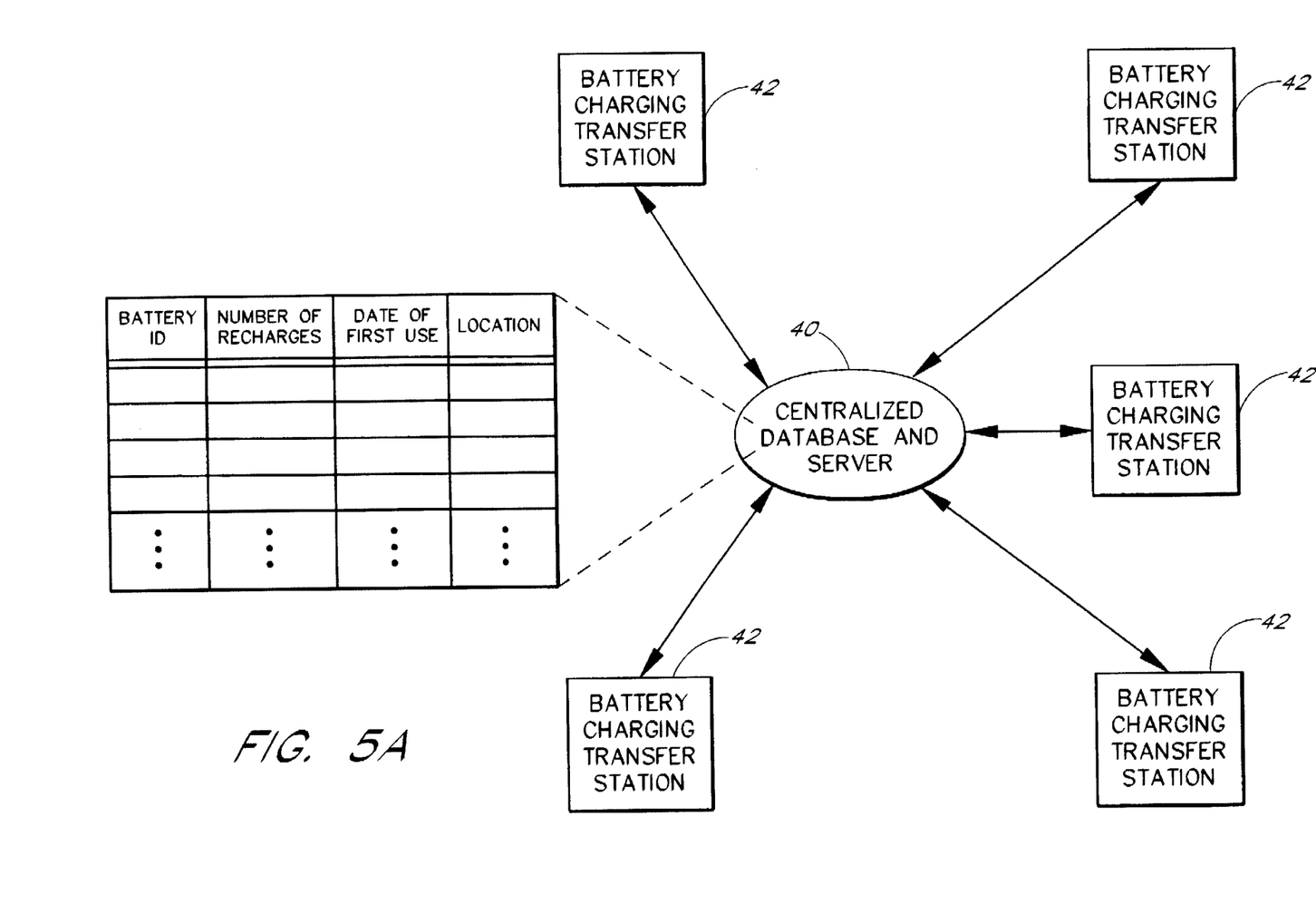
FIG. 5A is a block diagram showing a preferred database implementation in which battery history data is maintained in a centralized computer database.

With reference to FIG. 5A, the centralized database 40 is accessed by the respective computers of multiple, geographically-distributed battery charging and transfer stations 42 (preferably of the same construction as described herein). As further illustrated, the database includes battery tracking and history information ("history data") which is stored, on a battery-specific basis, in association with the unique ID codes of the batteries. For each battery, this information may include, for example, the number of times the battery has been recharged, the date of first use within a vehicle, and the current location (e.g., charging station or vehicle) of the battery. When a given battery is located within a vehicle, the location information may include information about vehicle (such as a vehicle ID number) and/or the vehicle's driver (such as the driver's credit card number). Updates to the database 40 are made remotely from the battery charging/transfer stations 42 by sending update requests across the network to the server associated with the database. These update requests are generated by the computers 37 of the individual stations in response to battery exchange operations.

As further described below, whenever a discharged battery is removed from a vehicle, the computer 37 of the respective station 42 reads the battery's ID code, and then accesses the centralized database to retrieve the battery's history data. The computer 37 then uses this information, in addition to the results of an electrical battery test, to determine whether or not the battery should be discarded or otherwise removed from the system. This allows the decision of whether or not to discard the battery to be based on multiple criteria.

While the preferred embodiment uses a centralized database 40 to store battery history data, it will be recognized that other storage methods are possible. For example, the batteries can readily be adapted to store and provide access to their own respective history data via conventional solid state storage devices located with the battery housing. This approach reduces or eliminates the need for a centralized database 40, but does not provide the battery tracking capabilities of the centralized database approach. It will also be recognized that conventional caching techniques can be used to locally store respective copies of the history database 40 at the transfer stations 42, so that accesses to the centralized database 40 need not be performed each time a battery is exchanged.

The actual battery exchange in the vehicle can be accomplished in any of a variety of alternative ways, depending upon the configuration of the battery and the vehicle's battery receiving structures. For example, instead of forcible displacement of the installed discharged battery with a new charged battery, the installed discharged battery can be previously removed such as by a sprocket as will be discussed infra. In addition, although the preferred embodiment utilizes a lateral, horizontal installation and removal of the battery, variations will become apparent to one of ordinary skill in the art in view of the disclosure herein and the desired battery compartment configuration for the vehicle.

For example, the battery can readily be adapted for vertical removal from the automobile followed by vertical installation of the new battery. Similarly, the battery can readily be horizontally removed along an axial direction such as from the rear of the car or from the front of the car. The precise location and mode of removal of the battery is a design consideration that can be optimized through routine experimentation by one of ordinary skill in the art, in view of such considerations as battery size, weight distribution in the vehicle, and other access considerations such as the location of doors, wheels and the like.

Although a single battery is preferred, two, three, four or more discrete batteries can also be removed or installed into a single vehicle. The use of multiple batteries contained in separate units may be desirable from an engineering or esthetic design standpoint, depending upon the automobile configuration and the total volume of battery desired. In addition, a principal running battery and a separate "reserve" battery may be desirable from a consumer convenience standpoint.

Adaptation of the various vertical lifts, conveyors and other structural components of the battery charging and transfer system of the present invention to accommodate each of these types of variations will be readily achievable by one of ordinary skill in the art in view of the disclosure herein.

Figure 7:
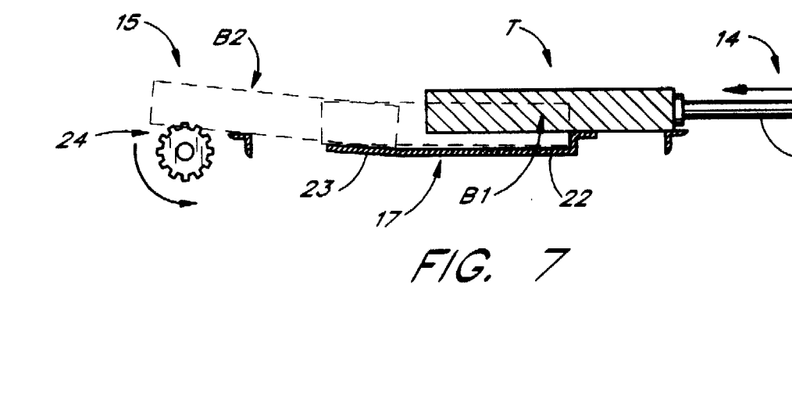
FIG. 7 is a transverse, fragmentary sectional view on the line 7—7 of FIG. 2.

A preferred apparatus and method for exchanging batteries will now be described. As illustrated by FIGS. 1 and 7, the transfer station T includes a hydraulic ram 20 having a rod 21 which extends outward to forcefully displace the battery or battery pack B into the vehicle. The rod 21 laterally forces the battery B1 (FIG. 7) into a battery seat 22 in the vehicle. The battery B1 displaces the existing vehicle battery B2, forcing the existing battery B2 onto an exit conveyor such as up an inclined ramp section 23 of the seat 22 toward the receiving end 15 of the conveyor.

The battery seat in the vehicle is structured to provide retention means to prevent lateral movement of the battery from the seat, except at the transfer station where suitable displacement means 16, such as the ram 20 is provided. Any of a variety of retention structures can be provided, depending upon the battery design and battery seat design. For example, one or more vertically extending ridges or projections can be provided at the installation side and/or the exit side of the battery to provide a stop over which the battery must travel to exit the car. The stop can be permanently positioned, or movable between a "locked" and "unlocked" position. Alternatively, any of a variety of battery compartment hatches can be used, which will normally be locked shut except during the battery exchange process. In the illustrated embodiment, the battery seat 22 (FIG. 7) is provided with a shoulder on the installation side of the seat, to prevent movement of the battery in the reverse direction.

Figure 8:
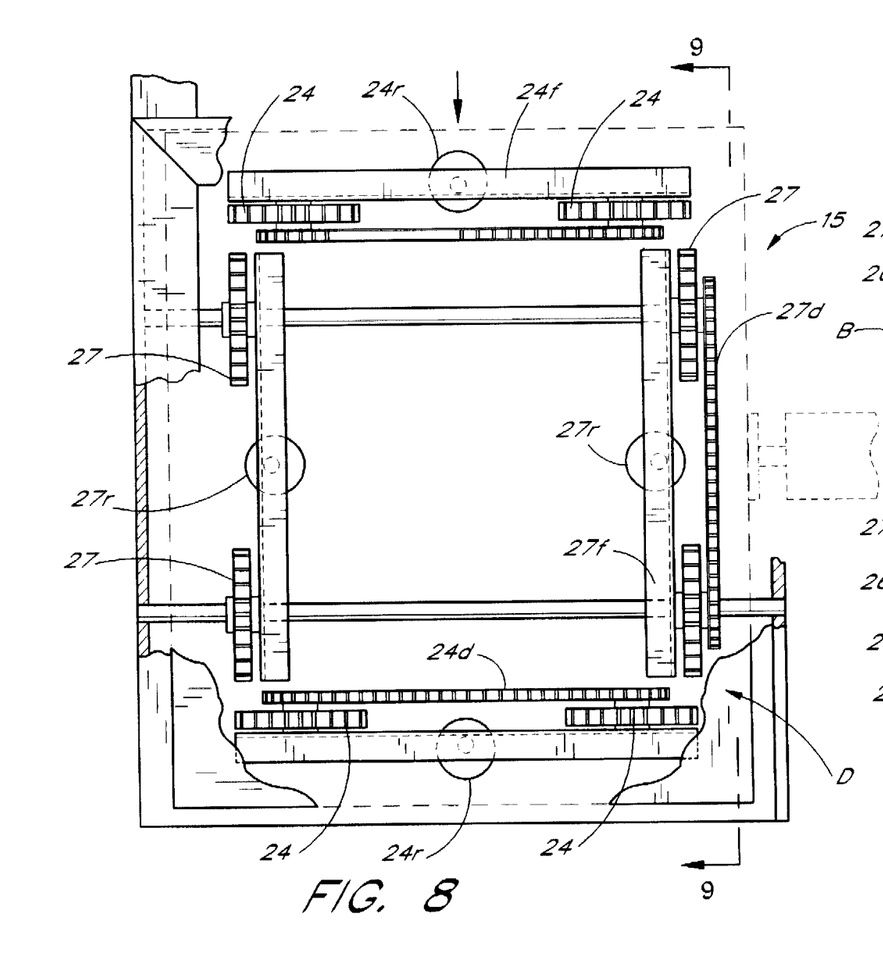
FIG. 8 is an enlarged, fragmentary top plan view, on the line 8—8 of FIG. 3, with parts broken away, showing the battery installation means.
Figure 9:
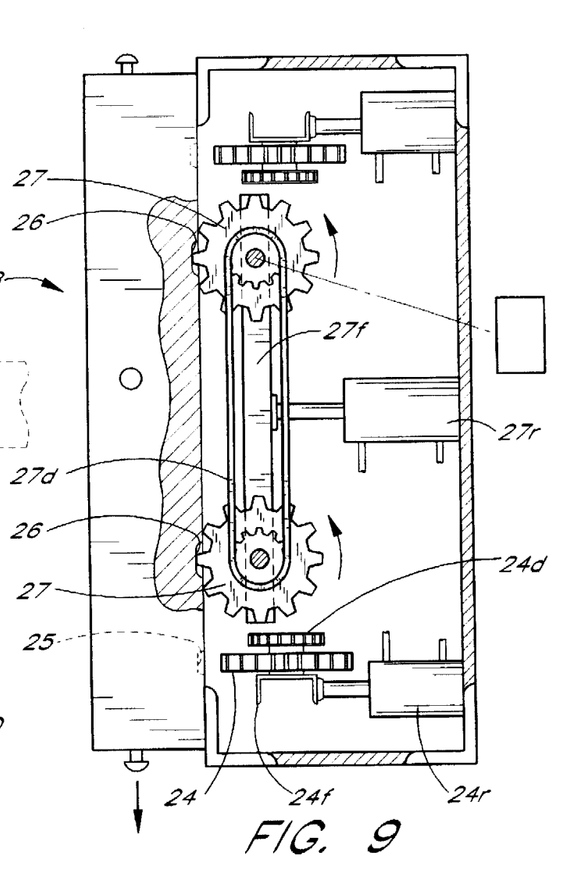
FIG. 9 is a vertical sectional view on the line 9—9 of FIG. 8, with parts broken away.

Drive means D, shown in FIG. 8, are provided to assist the lateral movement of the spent battery from the vehicle. Such drive means D may include, as partially shown in FIG. 7, driven sprocket means 24 adapted to engage in notches or recesses 25 (FIG. 6) on the bottom surface of the battery, to complete the transfer of the battery B2 from the vehicle onto the receiving station 15. The notches 25 are located preferably adjacent to the opposite ends of the battery B, and provide sprocket abutments enabling lateral drive of the battery. The underside of the battery also has laterally spaced sprocket receiving recesses 26, providing abutments engagable by additional drive sprockets 27 (FIGS. 8 and 9) adapted to engage and shift the batteries progressively through the charging stations in a lateral direction perpendicular to the direction of displacement. As is apparent from the figures, the notches 25, 26 illustrated in FIGS. 6 and 9 are representative of respective rows of notches which extend along the bottom surface of the battery.

Alternatively, any of a variety of engagement structures can be provided on the battery pack, to enable engagement with the drive mechanism of the transfer station. The use of a particular structure, such as hooks, rings, projections or recesses will depend upon the load of the battery to be transferred, the static friction or structural stop to be overcome in removing the battery, and the direction of removal, such as horizontal plane or vertical lift as will be readily apparent to one of skill in the art. In general, the engagement structures are preferably relatively low profile to minimize the opportunity for inadvertent interlocking with other batteries or parts of the system, and yet permit transfer of sufficient force to manipulate the battery through the transfer station. For this purpose, the present inventor prefers a plurality of spaced recesses on the battery housing, to be engaged by a sprocket as illustrated, or other engagement structure on the drive mechanism.

Although the system of the preferred embodiment uses the incoming battery to forcibly displace the existing battery, other battery removal methods can be used. For example, the vehicles can be provided with drive sprockets within the battery compartment for moving batteries into and out of the battery compartment, eliminating the need forcibly displace the existing battery. These sprockets may be powered using an external energy source which is coupled to vehicle (via a slidably-engaging electrical connector, for example) when the vehicle initially enters the charging station. In addition, although the present inventor prefers a system in which the batteries are introduced and removed in a continuous single direction path of travel, the conveyors and hydraulics of the transfer station can readily be modified by one of skill in the art to accomplish battery removal and installation from the same side of the vehicle if desired.

As illustrated by FIGS. 1 and 6, the battery has contact posts 30 at its opposite ends which are automatically engaged with contacts within the vehicle when the battery is shifted into the vehicle. Also, on opposite sides of the battery are charging contacts 31, which are also used as test contacts. Thus, when the battery is displaced from the vehicle at the transfer station T, the displaced battery enters the receiving station or position 15, and the contact 31 on one side engages a test rail 32 (FIG. 1). As best illustrated by FIG. 3, a vertically shiftable test contact 33 is adapted to be elevated and lowered by a ram 34 at the receiving position 15, whereby the battery can be tested. With further reference to FIG. 3, the elevator assembly 43 is coupled to the receiving station 15 to enable bad batteries to be removed from the conveyor system under the control of the computer 37. The battery removal assembly preferably includes a hydraulic ram 44 which displaces the battery from the vertically-shiftable receiving station 15 once the battery has been lowered to the level of the ram 44.

As batteries are progressively moved along the conveyor C from one battery position to another, the posts or contacts 31 (FIG. 1) engage charging rails 35 and 36. The charging rails 35 and 36 are controlled by a voltage regulator (not shown) so that the charge level of the batteries is controlled. Although the charging rails 35, 36 are only shown along one of the two longitudinal segments of the conveyor in FIG. 1, charging stations are preferably provided along both longitudinal segments.

As will be appreciated by those skilled in the art, a variety of different types of battery contacts 30, 31 can be used to reversibly place both the car and the charging station in electrical contact with the battery. In one embodiment, the contacts 30, 31 are retractable, spring-loaded members which retract into the housing of the battery in response to a physical driving force. In other embodiments, conductive contact surfaces either above or below the adjacent surface of the battery can be used in place of the retractable contacts. Alternatively, any of a variety of plugs, clips, conductive cables and the like can be used.

With reference to FIG. 1, the transverse drive notches 25 in the batteries are used by the conveyor system to laterally shift batteries from one longitudinal segment to the other longitudinal segment along the segment denoted generally by reference number 11. As best seen in FIGS. 8 and 9, because the transverse drive sprockets 24 and the longitudinal drive sprockets 27 cannot be simultaneously engaged with batteries, the sprockets 24 and drive means 24d are mounted on a frame structure 24f which is selectively vertically shifted by a ram 24r. Likewise a ram 27r vertically shifts the sprocket frame structure 27f and sprocket drive 27d. Thus, the sprockets 24 and 27 are selectively engagable with the battery drive recesses 25 and 26.

Figure 5B:
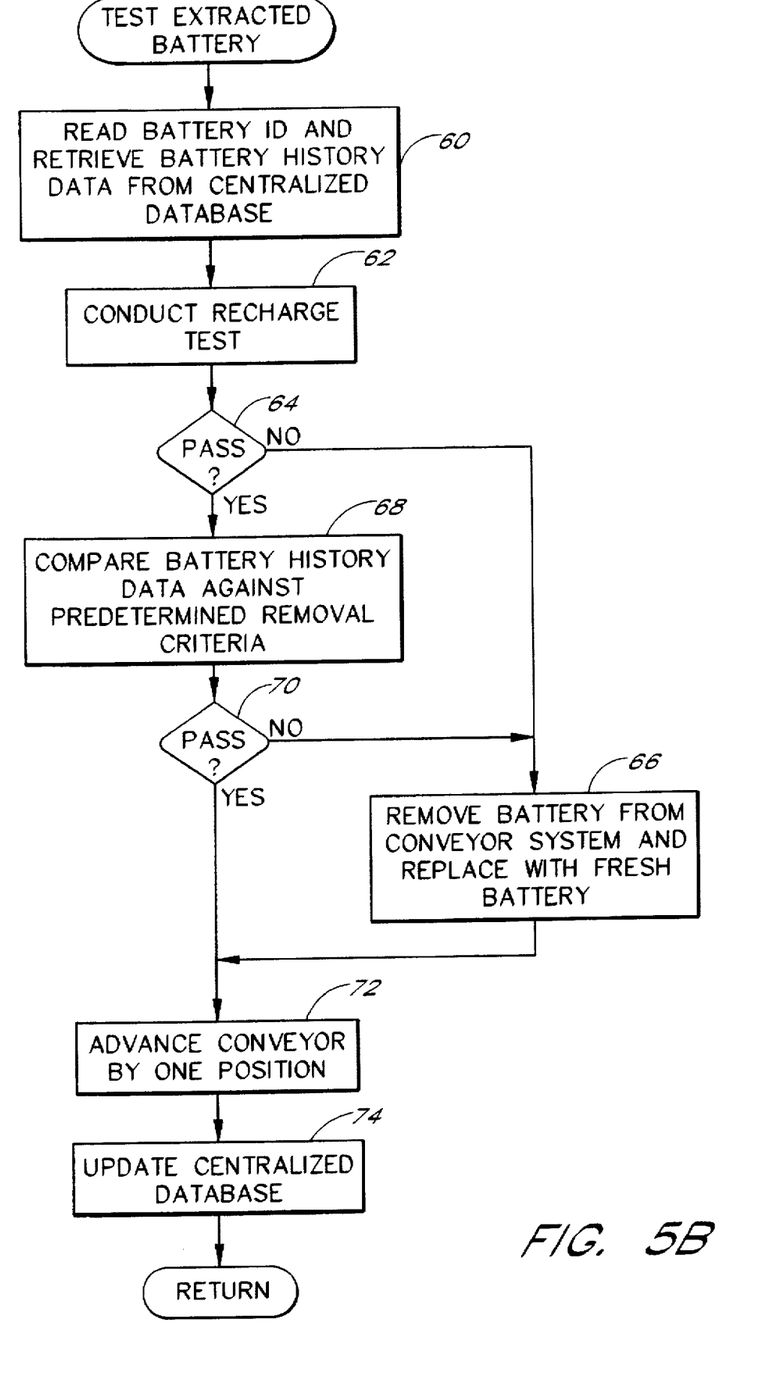
FIG. 5B illustrates a process followed by the computer of FIG. 5A when a battery is initially extracted from a vehicle.

FIG. 5B illustrates the general process followed by the computer 37 each time a battery is extracted from a vehicle. As depicted by block 60, the computer 37 initially reads the battery ID code with the bar code reader R, and then accesses the centralized database 40 to retrieve the history data of the battery. (In embodiments in which the history data is stored within the batteries, this step may, for example, involve an RF interrogation of the battery's circuitry to cause the battery to transmit its history data.) Concurrently with the data retrieval process, the computer 37 initiates the electrical battery recharge test to determine whether the battery can be adequately recharged, as indicated by block 62. If the battery fails the recharge test, it is removed from the conveyor C via the elevator assembly 43 and replaced with a fresh battery, as indicated by blocks 64 and 66.

With reference to blocks 68 and 70 if the battery passes the battery recharge test, the computer performs a second battery test which involves comparing the retrieved battery history data to pre-specified removal criteria, such as a maximum number of recharges and/or a maximum duration of use. If the battery fails to satisfy the predetermined criteria, it is removed from the system. This combination of an electrical test and a usage-history test provides a high degree of protection against the installation of bad batteries into vehicles.

With reference to blocks 72 and 74, once the battery tests have been conducted (and the battery replaced if necessary), the conveyor is advanced by one battery position. In addition, the centralized database is updated to reflect the results of the battery tests. If the system includes one or more expansion levels or modules (as in FIGS. 10 and 11), the computer 37 also executes code for shifting batteries between the two or more levels (as described below).

In addition to the battery testing code reflected by FIG. 5B, the computer 37 executes code for ensuring that the batteries are sufficiently recharged before being installed into vehicles. In the preferred embodiment, this is accomplished by keeping track, on a battery-specific basis, of the amount of time each battery has been recharged, and by ensuring that the next battery to be installed has been recharged for some minimum amount of time. (Because the batteries enter and exit the conveyor system on a first-in-first-out basis, the battery which resides at the delivery end 14 of the conveyor will normally have been in the system the longest.) In other implementations, a battery testing station may additionally or alternatively be provided at or near the battery delivery end 14 to test the batteries prior to installation. Whenever the computer 37 determines that the next battery to be installed within a vehicle is not sufficiently recharged, the computer displays a message on a road-side display sign (not shown) indicating that batteries are currently not available. This message also preferably indicates the number of minutes until recharged batteries will be available.

FIGS. 10 and 11 illustrate the general manner by which additional conveyor loops or modules are added to the system to increase battery capacity. The illustrated system includes a main conveyor loop C1, and an expansion conveyor loop C2 which is positioned above the main conveyor loop. Both conveyor loops are substantially identical to the conveyor loop C described above. Additional expansion conveyors can be added as needed to accommodate demand. In the preferred embodiment, both conveyor loops include charging stations (not shown) positioned along their respective longitudinal segments. Battery elevators 43A and 43B are provided at opposite ends of the two conveyor loops C1, C2 to permit the vertical movement of batteries between the two conveyor levels. Both conveyor loops C1, C2 preferably include battery chargers along their respective longitudinal segments, preferably at each battery position.

In operation, the battery elevator 43A at the receiving end receives displaced batteries from vehicles that pass through the system, and selectively delivers the discharged batteries (under the control of the computer 37) to either the upper or the lower conveyor loop C1, C2. The elevator 43B at the battery delivery end is similarly programmably shifted between the two conveyor levels to selectively remove batteries from the conveyor loops for delivery into vehicles. In the preferred embodiment, the computer 37 is programmed to alternate between the two conveyor loops so that roughly half of the batteries are passed through the lower loop C1 and the other half passed through the upper loop C2. With this general approach, the addition of new conveyor loops inherently increases the mount of time each battery spends in the system, and thus increases the available recharge time per battery. Additional conveyor loops can be added to accommodate increased demand.

Although this invention has been described in terms of certain preferred embodiments, other embodiments that are apparent to those of ordinary skill in the art in view of the disclosure herein are also within the scope of this invention. Accordingly, the scope of the invention is intended to be limited only by reference to the appended claims.

What is claimed:

1. A method of rapidly exchanging a battery of an electrically powered passenger vehicle, the vehicle having a battery compartment which extends through at least a portion of the vehicle, the method comprising the steps of:

providing a battery transfer and charging station comprising:

a drive-through vehicle bay;

a continuous battery transfer conveyor within the drive-through bay, the conveyor having a battery receiving end which receives an at least partially discharged battery from a first end of the battery compartment, and having a battery delivery end which delivers a charged battery to a second end of the battery compartment, the conveyor having multiple battery positions between the receiving and delivery ends to hold multiple batteries; and a computer which controls the battery transfer conveyor by advancing the conveyor in single-battery-position increments to move batteries from the battery receiving end to the battery delivery end, the computer coupled to an electronic payment system which allows an operator of the vehicle to specify payment source information for payment of a fee associated with an exchange of the discharged battery with the charged battery;

positioning the vehicle within the drive-through bay such that the battery compartment is aligned with the battery receiving and delivery ends of the conveyor, the battery compartment containing the discharged battery;

specifying payment source information via the payment system to enable the computer to initiate a battery exchange operation; and exchanging the discharged battery with the charged battery by programmably advancing the conveyor with the computer to shift the charged battery from the delivery end of the conveyor into the compartment while moving the discharged battery from the compartment to the receiving end of the conveyor.

2. The method as in claim 1, wherein exchanging the discharged battery with the charged battery comprises advancing the conveyor by exactly one battery position.

3. The method as in claim 1, wherein exchanging the discharged battery with the charged battery comprises forcibly displacing the discharged battery from the battery compartment with the charged battery.

4. The method as in claim 1, wherein the conveyor comprises an electronic sensing device coupled to the computer for detecting unique ID codes of batteries on the conveyor, and wherein the method comprises sensing the unique ID code of the discharged battery with the sensing device.

5. The method as in claim 4, wherein the electronic sensing device comprises a bar code reader.

6. The method as in claim 4, further comprising the steps of:

accessing a database with the unique ID code and the computer to retrieve historical data which is unique to the discharged battery; and using said historical data to determine whether to remove the discharged battery from conveyor.

7. The method as in claim 6, wherein the historical data indicates a date of first use of the discharged battery.

8. The method as in claim 6, wherein accessing a database comprises accessing a centralized database over a computer network, the centralized database located at a geographically remote location relative to the transfer and charging station.

9. The method as in claim 6, wherein the historical data indicates the number of times the discharged battery has previously been recharged.

10. The method as in claim 1, wherein specifying payment source information comprises placing a credit card into a magnetic card reader.

11. The method as in claim 1, wherein specifying payment source information comprises activating a vehicle transponder.

12. The method as in claim 1, wherein the conveyor comprises battery charging stations at least some of the battery positions, and wherein the method further comprises charging the discharged battery at successive charging stations.

13. The method as in claim 1, further comprising the steps of:

providing at least one battery expansion module coupled to the continuous conveyor by a battery elevator, the expansion module including a second battery conveyor which holds multiple batteries; and advancing the discharged battery to the expansion module with the elevator.

14. The method as in claim 1, further comprising advancing the vehicle through the drive-through bay above or below a vertically displaced segment of the conveyor without interrupting the battery transfer path between the receiving and delivery ends of the conveyor.

* * * * *